(12) United States Patent
Wu et al.

(10) Patent No.: US 6,865,680 B1
(45) Date of Patent: Mar. 8, 2005

(54) METHOD AND APPARATUS ENABLING AUTOMATIC LOGIN FOR WIRELESS INTERNET-CAPABLE DEVICES

(75) Inventors: Jonathan Wu, Mountain View, CA (US); Neil Daswani, Edison, NJ (US); Anand Rangarajan, Sunnyvale, CA (US)

(73) Assignee: Yodlee.com, Inc., Redwood Shores, CA (US)

( * ) Notice: Subject to any disclaimer, the term of this patent is extended or adjusted under 35 U.S.C. 154(b) by 1079 days.

(21) Appl. No.: 09/703,432

(22) Filed: Oct. 31, 2000

(51) Int. Cl.[7] .................... H04L 9/00; G06F 11/30; G06F 15/16; H04K 1/00
(52) U.S. Cl. ............. 713/201; 713/182; 713/184; 713/193; 713/202; 380/270; 709/229
(58) Field of Search ................ 713/193, 182, 713/184, 201, 202; 380/201, 202, 270, 280; 709/225, 226, 229

(56) References Cited

U.S. PATENT DOCUMENTS

| | | | | |
|---|---|---|---|---|
| 5,940,590 A | * | 8/1999 | Lynne et al. ............... 713/200 |
| 6,065,120 A | * | 5/2000 | Laursen et al. ............. 713/201 |
| 6,584,507 B1 | * | 6/2003 | Bradley et al. ............. 709/229 |
| 6,594,692 B1 | * | 7/2003 | Reisman ..................... 709/219 |
| 6,601,020 B1 | * | 7/2003 | Myers ........................ 702/186 |
| 6,629,136 B1 | * | 9/2003 | Naidoo ....................... 709/219 |
| 6,704,784 B2 | * | 3/2004 | Matsuda et al. ............ 709/224 |
| 6,735,441 B1 | * | 5/2004 | Turgeon et al. ............. 455/433 |
| 6,754,825 B1 | * | 6/2004 | Lennie et al. ............... 713/181 |
| 6,760,746 B1 | * | 7/2004 | Schneider ................... 709/203 |
| 6,760,759 B1 | * | 7/2004 | Chan .......................... 709/219 |

FOREIGN PATENT DOCUMENTS

EP          690626 A2  *  1/1996  .......... H04N/7/173

* cited by examiner

*Primary Examiner*—Thomas R. Peeso
*Assistant Examiner*—Kambiz Zand
(74) *Attorney, Agent, or Firm*—Donald R. Boys; Central Coast Patent Agency, Inc.

(57) ABSTRACT

A network-based system for providing automatic login to a network-connected data source on behalf of a network-connected user accessing the system through a wireless communication appliance is provided. The system comprises, a wireless communication appliance, the appliance having network capability and an interactive user interface, the appliance operated for the purpose of accessing the network-connected data source, a network service-provider for providing access to the network; a network gateway for managing communication between the appliance and network-connected data source, a network-connected server node for performing proxy navigation and automated login services for the network-connected user, a data repository accessible to the network-connected server node, the data repository for holding data about the network-connected user and, a network-connected data source, the data source accessible to the network-connected server node. In preferred embodiments, a user operating the appliance while connected to the network invokes a hyperlink displayed in the user interface, the hyperlink containing a browser instruction for contacting the network-connected server node, the server node directing automated navigation to and login to the data source defined by the hyperlink, the login is accomplished through automated insertion of user data retrieved from the data repository into the appropriate fields of a login request.

54 Claims, 8 Drawing Sheets

METHOD AND APPARATUS ENABLING AUTOMATIC LOGIN FOR WIRELESS INTERNET-CAPABLE DEVICES

FIELD OF THE INVENTION

The present invention is in the field of Internet-based services and applications, and pertains more particularly to methods for providing an automatic login capability to websites accessed by users operating wireless Internet-capable devices.

Background of the Invention

The information network known as the World Wide Web (WWW), which is a subset of the well-known Internet, is arguably the most complete source of publicly accessible information available. Anyone with a suitable Internet appliance such as a personal computer with a standard Internet connection may access (go on-line) and navigate to information pages (termed web pages) stored on Internet-connected servers for the purpose of garnering information and initiating transactions with hosts of such servers and pages.

Many companies offer various subscription services accessible via the Internet. For example, many people now do their banking, stock trading, shopping, and so forth from the comfort of their own homes via Internet access. Typically, a user, through subscription, has access to personalized and secure WEB pages for such functions. By typing in a user name and a password or other personal identification code, a user may obtain information, initiate transactions, buy stock, and accomplish a myriad of other tasks.

One problem that is encountered by an individual who has several or many such subscriptions to Internet-brokered services is that there are invariably many passwords and/or log-in codes to be used. Often a same password or code cannot be used for every service, as the password or code may already be taken by another user. A user may not wish to supply a code unique to the user such as perhaps a social security number because of security issues, including quality of security that may vary from service to service. Additionally, many users at their own volition may choose different passwords for different sites so as to have increased security, which in fact also increases the number of passwords a user may have.

Another issue that can plague a user who has many passworded subscriptions is the fact that they must bookmark many WEB pages in a computer cache so that they may quickly find and access the various services. For example, in order to reserve and pay for airline travel, a user must connect to the Internet, go to his/her bookmarks file and select an airline page. The user then has to enter a user name and password, and follow on-screen instructions once the page is delivered. If the user wishes to purchase tickets from the WEB site, and wishes to transfer funds from an on-line banking service, the user must also look for and select the personal bank or account page to initiate a funds transfer for the tickets. Different user names and passwords may be required to access these other pages, and things get quite complicated.

Although this preceding example is merely exemplary, it is generally known that much work related to finding WEB pages, logging in with passwords, and the like is required to successfully do business on the WEB.

A service known to the inventor, which is the subject of a separate patent application, provides a WEB service that allows a user to store all of his or her password protected pages in one location such that browsing and garnering information from them is much simplified. A feature of the above service allows a user to program certain tasks into the system such that requested tasks are executed by an agent (software) based on user instruction. The service stores user password and log-in information and uses the information to log-in to the user's sites, thus enabling the user to navigate without having to manually input log-in or password codes to gain access to the links.

The above-described service has been more commonly practiced by users having network access by way of an Internet-capable personal computer (PC) and suitable Internet connectivity. However, with the advent of stand-alone, Internet-capable wireless appliances along with protocols designed to facilitate data communication between such devices and data sources hosted on the network, the service described above has been extended and integrated into the world of wireless Web communication.

Two well-known protocols used to facilitate wireless communication and data transfer are the wireless-applications-protocol (WAP) used with cellular devices and which supports a language protocol known as hand-held device markup language (HDML), and what is known as a personal query application (PQA) protocol used with the Palm™-class computers. As is known in the art, Internet-capable wireless appliances command much less resource than does a full-service computer. For this reason special protocols and computer languages such as the ones described above have been developed. Examples of the types of appliances this specification refers to are hand-held computers of the Palm™class (Palm computers), and Internet-capable telephones operating through the well-known cellular network system.

In the current state of the art, Web-based services exist that allow users operating Internet-capable wireless appliances to access servers operating on the network and receive scaled-down versions of Web pages, which were formerly only available to users operating more robust appliances such as laptops and PCs. Data from the network is propagated to wireless devices such as the Palm devices in what are known as personal query applications (PQAs), which are essentially binary files compiled for the Palm OS™ platform. A PQA encapsulates a small set of hyper-text-markup-language (HTML) files and compact graphics representing specially designed and scaled-down versions of HTML documents available over the Internet.

Most PQAs contain a static homepage for the company that compiled that PQA. This static homepage could contain links (hyperlinks) to other static pages also encapsulated in the PQA or to dynamically-served pages hosted on the Internet. The selection of websites a user may visit for one PQA interface is limited generally to those supported by the service that the particular user subscribes to in order to access the Internet network.

In some cases of access from a wireless device, a user may have access to one or more personal or sensitive sites defined as those sites requiring user authentication via user name and password submission. However, the user must enter user name and password information, or other authentication criteria, by using whatever input methods are available to the device. It is well-known that data-input methods and mechanisms for small portable devices are not as well developed or as easy to use as those provided with standard computer systems. Moreover, a user subscribing to a plurality of sites must remember a plurality of authentication data in order to access those sites.

What is clearly needed is a method and apparatus for enabling automatic login to authentication-oriented websites from wireless Internet-capable appliances wherein access may be achieved through user interaction with a link provided in a PQA or within a WAP-compliant interface served to the device. Such a method and apparatus would alleviate much frustration for users who routinely access sensitive sites through portable devices.

SUMMARY OF THE INVENTION

In a preferred embodiment of the present invention, a network-based system for providing automatic login to a network-connected data source on behalf of a network-connected user accessing the system through a wireless communication appliance is provided. The system comprises, a wireless communication appliance, the appliance having network capability and an interactive user interface, the appliance operated for the purpose of accessing the network-connected data source, a network service-provider for providing access to the network; a network gateway for managing communication between the appliance and a network-connected data source, a network-connected server node for performing proxy navigation and automated login services for the network-connected user, a data repository accessible to the network-connected server node, the data repository for holding data about the network-connected user and, a network-connected data source, the data source accessible to the network-connected server node.

A user operating the appliance while connected to the network invokes a hyperlink displayed in the user interface, the hyperlink containing a browser instruction for contacting the network-connected server node, the server node directing automated navigation to and login to the data source defined by the hyperlink, the login accomplished through automated insertion of user data retrieved from the data repository into the appropriate fields of a login request.

In a preferred embodiment, the system is implemented on the Internet network. In one aspect, the wireless communication appliance is a handheld computer. In another aspect, the wireless communication appliance is a cellular telephone. In one aspect, the network service-provider and the network gateway are hosted by a single entity. In another aspect, the network service-provider, the network gateway, and the network-connected server node are hosted by a single entity.

In one aspect of the system, the user data comprises a user name and password pair required as authentication to the network-connected data source defined by the hyperlink. In other aspects, the user data comprises a personal identification code. In still another aspect, the user data comprises a user name and password pair and a personal identification code.

In one aspect of the system, invocation of the hyperlink results in an HTTP request containing an HTML form for logging into the network-connected data source, the form replaced with a similar form generated by the network-connected server node, the similar form containing the authentication information. In one aspect, the authentication information is a user name and password pair. In another aspect, the authentication information is a personal identification code. In still another aspect, the authentication information is a user name and password pair and a personal identification code.

In another aspect of the system, invocation of the hyperlink results in an HDML request containing an HDML form for logging into the network-connected data source, the form accepting the user authentication information inserted therein by the network-connected server node. In one aspect, the authentication information is a user name and password pair. In another aspect, authentication information is a personal identification code. And in still another aspect, the authentication information is a user name and password pair and a personal identification code.

In another aspect of the system, the automated login includes generation of a session ID at the network-connected data source, the session ID retrieved from the data source by the network-connected server node and passed back to the requesting appliance. In one aspect, the session ID is of the form of a cookie. In another aspect, the automated log in includes generation of a session ID at the network-connected data source, the session ID retrieved from the data source by the network-connected server node and passed back to the network gateway used by the requesting appliance. In one aspect, the session ID is of the form of a cookie.

In one aspect of the system, wireless-application-protocol (WAP) is the communication protocol used. In another aspect, wireless-markup-language (WML) is the communication language.

According to another aspect of the present invention, a proxy server for performing automated navigation and login to a network-connected data source on behalf of a network-connected user operating a network-capable wireless appliance is provided. The proxy server comprises, at least one port for receiving requests from the wireless appliance, at least one port for establishing a network connection to the data source, at least one port for establishing a data connection to a data repository and a software engine for retrieving data from the data repository and inserting the data into appropriate fields of a request to the data source. Upon receiving a request from the wireless appliance, the proxy server retrieves authentication data from the data repository and inserts the data into the request or into a duplicate thereof. The request, containing the authentication data is sent to the data source whereupon the data source accepting the authentication data registers a successful login, and authenticates the user for an established data session.

In a preferred embodiment, the proxy server is hosted and operable on the Internet network. Also in one embodiment, the above-mentioned wireless appliance is a handheld computer. In another embodiment, the wireless appliance is a cellular telephone.

In one aspect, the proxy server further comprises, software for enabling function as a network service-provider and software for enabling function as a network gateway. In most aspects, the data retrieved from the data repository comprises a user name and password pair required as authentication data for logging into to the network-connected data source. In another aspect, the data retrieved from the data repository comprises a personal identification code. In still another aspect, the data retrieved from the data repository comprises a user name and password pair and a personal identification code.

In all aspects of the proxy server, the received request from the wireless appliance results from user invocation of a provided hyperlink viewable in the display portion of the wireless appliance. In one aspect, the received request from the wireless appliance is an HTTP request. In another aspect, the received request from the wireless appliance is an HDML request. In still another aspect, the received request from a wireless appliance is a WML request. In these aspects, a data session established by the proxy server on behalf of the network-connected user is rendered under the control of the user. In one aspect, the automated login includes generation of a session ID at the network-connected data source, the session ID retrieved from the data source by the proxy server and passed back to the requesting appliance. In one aspect, the session ID is of the form of a cookie. In another aspect, the automated log in includes generation of a session ID at the network-connected data source, the session ID retrieved from the data source by the proxy server and passed back to a network gateway used by the requesting appliance. In one aspect, the session ID is of the form of a cookie. In still another aspect, the network gateway and the proxy server function are hosted on a same machine.

In another aspect of the present invention, a method for establishing a network data session by proxy on behalf of a user operating a network-capable, wireless appliance is provided. The method includes the steps of (a) providing a hyperlink within a user interface of the network-capable appliance, the hyperlink specifying the data source and the proxy-service node to establish the session, (b) invoking the hyperlink thereby communicating a request for site-access to the proxy-service node, (c) receiving the request at the proxy-service node, (d) retrieving authentication data from a connected data repository for insertion into the appropriate form-fields of the request, (e) sending the request containing the authentication criteria and action instructions to the target site identified in the request, (f) logging in to the target site and authenticating the user by submitting the appropriate form containing the authentication data and (g) rendering, the established and authenticated data session under the control of the requesting user.

In a preferred embodiment, the method is practiced on the Internet network. In one aspect, the network-capable, wireless appliance is a handheld computer. In another aspect, the network-capable, wireless appliance is a cellular telephone.

In one aspect of the method in step (a), the provided hyperlink contains browser instruction for performing proxy navigation and auto login procedures. Also in this aspect in step (a), the provided hyperlink further contains instruction for retrieval of authentication data required for login purposes. In one aspect of the method in step (b), the site-access request is an HTTP request. In another aspect, the hyperlink is of the form of an HDML link. In still another aspect, the hyperlink is of the form of a WML link. In yet a further aspect, the hyperlink is of the form of an HTML link.

In another aspect of the method in step (d), the authentication data is of the form of the user name and password pair required to access the site. In another aspect, the authentication data is of the form of a personal identification code required to access the site. In still another aspect, in step (d), the authentication data is of the form of a personal identification code and the user name and password pair required to access the site. And in still another aspect in step (d), a login form contained within the received request is replaced with a similar form already containing the appropriate authentication data.

Now, for the first time, a method and apparatus for enabling automatic login to authentication-oriented websites from wireless Internet-capable appliances is provided wherein access may be achieved through user interaction with a link provided in a PQA or within a WAP-compliant interface served to the device. Such a method and apparatus alleviates much frustration for users who routinely access sensitive sites through portable devices.

BRIEF DESCRIPTION OF THE DRAWING FIGURES

DESCRIPTION OF THE PREFERRED EMBODIMENTS

According to a preferred embodiment of the present invention, a method and apparatus for enabling auto-login capability to a variety of wireless, Internet-capable appliances is provided. The method and apparatus of the present invention is described in enabling detail below.

Figure 1:
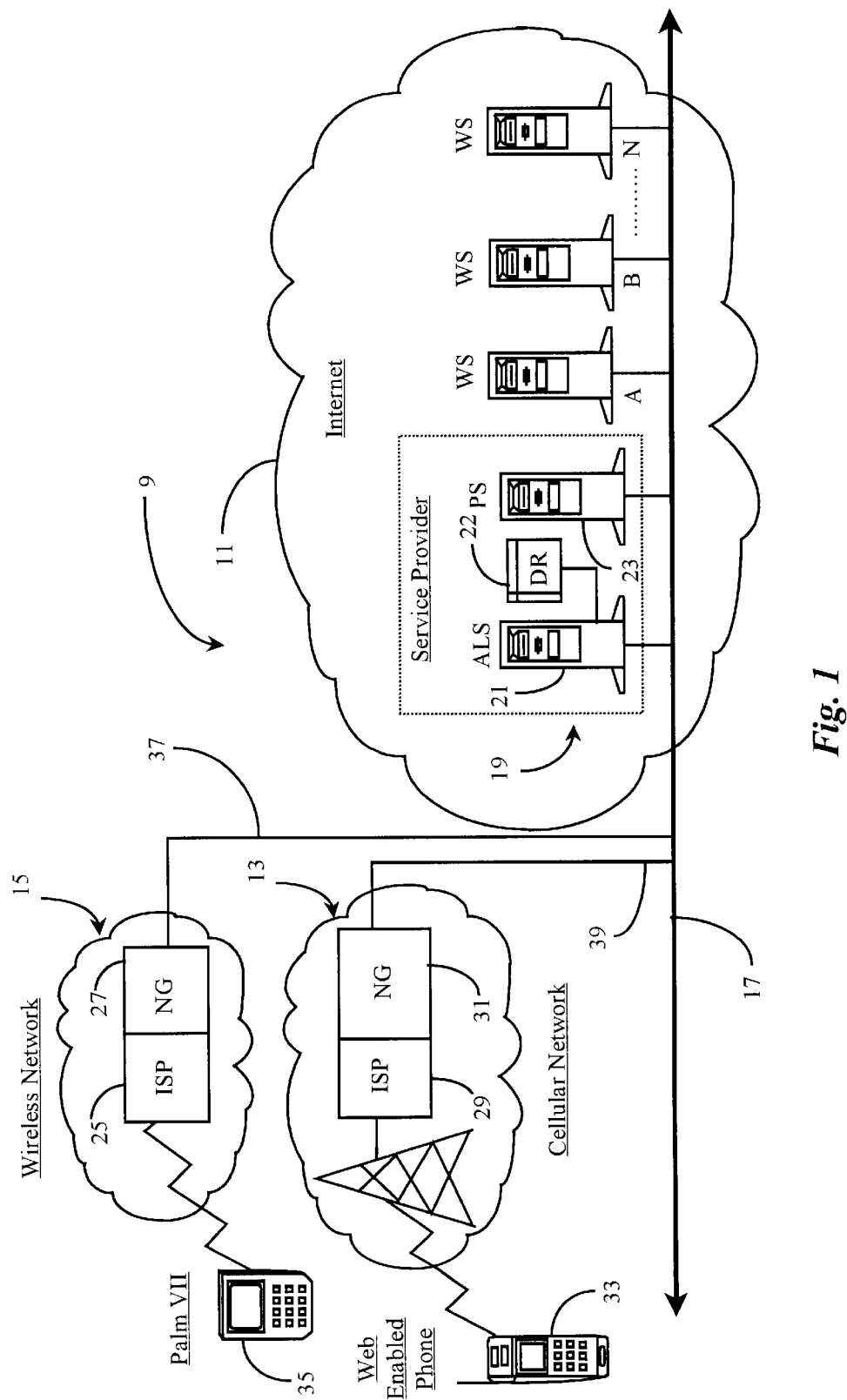
FIG. 1 is an overview of a communication network wherein auto-login is practiced according to an embodiment of the present invention.

FIG. 1 is an overview of communication network 9 wherein auto-login for wireless devices is practiced according to an embodiment of the present invention. Communication network 9 represents an overall communication network comprising an Internet network 11, a wireless network 15 and a cellular network 13.

Internet 11 represents the well-known to Internet network also represented herein by an Internet backbone 17. Backbone 17 represents all the lines equipment and connection points making up the Internet network as a whole. Therefore, are no geographic limitations to the practice of the present invention.

Intermediary networks 15 (wireless network) and 13 (cellular network) are represented herein to exemplify Internet connection methodology for a hand-held computer 35 label herein as a Palm VII™, and an Internet-capable, wireless telephone 33 labeled as a Web-enabled phone. Wireless networks 15 may be assumed to be a digital networks while cellular network 13 may be assumed to be digital and/or analog. One with skill in the art of wireless networks will appreciate that there are many varying configurations, protocols, and data-transfer technologies available in wireless networking. The inventor intends only to show that appliance 35 and 33 access Internet 11 using applicable wireless technologies available in the art.

A service-providing entity 19 is provided within Internet 11 and adapted by equipment and software to provide various Internet-based services to users using any type of Internet-capable appliance and appropriate Internet connection means. It may be assumed in this example that entity 19 provides all the service as described with reference to the U.S. patent application referred to in the background section of this specification. Such services are centered around data compilation, aggregation and summary services, which include automated proxy navigation utilizing sensitive authentication and login information maintained on behalf of subscribing users. As was described in the background section, it is desired by the inventor to provide similar service capabilities to users accessing the service through, for example, appliances 35 and 33, as those available to users accessing the service via more robust appliances such as PCs and laptop computers.

Service provider 19 maintains a portal server (PS) 23, illustrated in this embodiment, connected to Internet backbone 17. PS 23 is adapted as a user interface for users accessing services through a variety of Internet-capable appliances and Internet-connection technologies. PS 23 serves personalized Web pages, which may contain updated summary information about a user's frequently visited websites, interactive interfaces for performing various Internet tasks, hyperlinks to other websites offering services and so on. Wireless versions (PQAs) of the Web pages served by PS 23 are available for wireless users accessing services through such as hand-held computer 35, which in this example is a Palm VII™. A similar protocol exists and is available for users accessing through devices such as Web-enabled phone 33 illustrated in this example. As described in the background section these protocols are known in the art and are continually being refined by manufacturers cooperating with consortiums in order to enable higher quality services with respect to data transfer, interaction capabilities and graphical interfacing for wireless appliances communicating with data sources on the Internet.

An auto-login server (ALS) 21 is provided within the domain of service provider 19 and is also illustrated as connected to Internet backbone 17. ALS 21 is adapted to provide automated login services for users operating and accessing services via wireless appliances 35 and 33. ALS 21 provides a service that relies in part on a fact that users accessing provider 19 through appliances 35 and/or 33 are subscribers and have many if not all of their user names, passwords, and other sensitive profile information maintained in their behalf at the physical premise of provider 19. ALS 21 is enabled to retrieve login information on behalf of users and, through software means, actually log into websites on behalf of users. More detail regarding ALS 21 is provided below.

A data repository (DR) 22 is provided within service provider 19 and illustrated as connected directly to ALS 21 via a high-speed data connection. DR 22 is adapted to hold data about users who subscribe to the services offered by provider 19. Such data may include but is not limited to user-profile information, user-name and password information, user device-authentication information, user site-data (aggregated site data), and so on. In this example, the art 22 is illustrated as an external repository. In another embodiment, repository 22 may be internal to ALS 21. In still another embodiment, PS 23 may also be directly connected to DR 22 by virtue of a high-speed connection. Moreover, it will be apparent to one was skill in the art that the function of ALS 21 and PS 23 may be combined to execute on one centralized server without departing from the spirit and scope of the present invention. The inventor separates the functions of ALS 21 and PS 23 for illustrative purposes only.

A plurality of Web servers (WS) A and B–N are illustrated within Internet 11 and are representative of various Web servers hosted within Internet 11. Web servers A–N may be assumed in this example to offer any type of Internet-based services that may be available and accessed by network-connected users operating appliances 35 and 33. As such, it may be assumed that Web servers A–N are adapted for serving scaled down versions of HTML pages using protocols for wireless interfacing.

Within the wireless networks 15 is illustrated an Internet service provider (ISP) 25 and a network gateway (NG) 27. ISP 25 is adapted to provide Internet-access services to users operating hand-held 35. NG 27 is adapted to provide a functional network gateway required to facilitate successful communication between network 15 and Internet 11 with respect to the operation of hand-held 35. In actual practice, the functions of ISP 25 and NG 27 are generally provided by a single hosting entity such as AT&T wireless services, for example. The inventor separates the described functionalities of ISP 25 and NG 27 for illustrative purposes only. NG 27 is illustrated as connected to backbone 17 by an Internet-access line 37.

It may be assumed in this example that a user operating hand-held 35 subscribes to provider 19 to obtain wireless services, which are delivered utilizing the protocols applicable to a Palm VII™ operating system (OS). It is also assumed in this example that Web servers A–N also provide services using protocols applicable to a Palm VII™ OS. Therefore, it may be assumed that a PQA is utilized in the transfer of data between any of the described Internet connected servers and hand-held computer 35. It will be apparent to the skilled artisan that other types of hand-held computers adapted for different platforms and protocols may be substituted for hand-held 35 without departing from the spirit and scope of the present invention. In these cases, it may be assumed that the platforms and protocols used are also supported at all illustrated servers.

Cellular network 13 contains an ISP 29 and a network gateway (NG) 31. Also illustrated within network 13 is a communication tower illustrated by a simple icon. As described above with respect to ISP 25 and NG 27 within wireless networks 15, ISP 29 and NG 31 may be hosted by a single entity providing Internet-access services accessible to Web-enabled phone 33. NG 31 is illustrated as having connection to backbone 17 by virtue of an Internet-access line 39. It may be assumed in this example that any of the previously mentioned Internet-connected servers support the protocols and platform generic to phone 33.

It is important to note herein that service provider 19 cooperates with any entities hosting communication facilitation equipment has represented in this example by ISP 25, NG 27, ISP 29, and NG 31. For example, it is known that entities hosting gateways and network-access points for wireless communication devices provide PQA or WAP user interfaces, which are displayable and interaction-capable with respect to the appliances that they are served to.

To further illustrate the above-described parameter, assume that a user operating hand-held 35 wishes to access information from one or more of Web servers A–N. In a prior-art scenario excluding service provider 19, the user would log on to Internet 11 by way of the entity hosting ISP 25 and NG 27 and receive a PQA (not shown) after authenticating hand-held 35 for network operation. The PQA may contain interactive mechanisms for receiving e-mail from a registered e-mail account along with other standard services offered by the entity hosting network access for hand-held 35. Static hyperlinks to other websites may be included in the first interface served after successful login. If one or more of these sites is a user-subscribed site and requires a form of authentication for entry, then the user operating hand-held 35 must key in the appropriate data and submit the data to gain access to the selected site requiring the data.

According to one embodiment of the present invention, service provider 19 may, through contractual arrangement with the entity hosting network access for hand-held 35, provide a substitute interface (PQA) for the normally served PQA interface. This enhanced interface would contain all the prior functionality and services of a normal interface with added hyperlinks for performing automatic login to any authentication-sensitive sites, which may be listed in the interface. For example, if server A is listed in a first interface as a bank server subscribed to by the user operating hand-held 35, then an auto-login link is provided such that the user operating hand-held 35 may interact with it to automatically navigate to and login to server A without the requirement of inputting user-name, passwords or other authentication data. It is noted herein that actual navigation and login is performed by proxy.

The provided auto-login link to Web server A, or more specifically to a web site hosted by Web server A, is linked to ALS 21 such that when a user invokes the hyperlink, ALS 21 receives the request. ALS 21 is enabled by software and the fact that the required authentication information for approving access of the user operating hand-held 35 to the site hosted within Web server A is held on behalf of the user within DR 22. ALS 21 navigates to Web server A, retrieves the required authentication data from DR 22, and populates the applicable login mechanism (electronic form) to access the target site hosted by server A. After successful login, ALS 21 returns the opened session to the user operating hand-held 35. In this way, the accessing user does not see the actual login page but is served the first main or welcome page normally served after a successful login transaction.

In one embodiment, provider 19 actually provides a complete and new interface containing auto-login links, which are constructed to contact ALS 21 when invoked. In this embodiment, the auto-login links are constructed with inserted coded data-sets that point to the actual authentication data stored in DR 22. In another embodiment service provider 19 simply makes the auto-login links available to be installed in a standard PQA interface employed by individual hosts for enabling, in this case, Palm™ access. In this embodiment the links may contain actual authentication data or simply pointers to the data as previously described. ALS 21 brokers any auto-login transactions between the user 35 and any one of Web servers A–N. Such transactions, according to the scope of this example, include submission of authentication data in order to access a site or sites hosted within Web servers A–N and which are listed for access in a served PQA.

A user operating Web-enabled phone 33 may log in to Internet 11 by way of communication facilitation equipment ISP 29 and NG 31 and by way of Internet-access line 39. ALS 21 provides the same service with respect to Web-enabled phone 33 with the exception that the protocols and platform differ somewhat. For example, the interface used on phone 33 will be different than the one used on hand-held 35. However, the mechanisms (applications) used to facilitate communication for both devices operating on Internet 11 are somewhat similar with respect to form.

With cellular phones, there are several conceivable protocols known to the inventor, which define variable methods for authenticating a WAP-enabled phone for a login required data session. These methods are detailed later in this specification. All that is required in order to practice the present invention is that the users operating hand-held 35 and phone 33 have access to their auto login sites from their respective interfaces and that they store their login information to those sites at the premise of service provider 19 or at a network-connected location accessible to provider 19. ALS 21 provides the proxy services necessary to insert the auto login data into requests resulting from interaction with provided auto-login links. The exact nature of the service will depend on the type of accessing device and session method employed in communication.

WAP-enabled cell phones illustrated herein by appliance 33 operate somewhat differently in communication parameter than do Palm™-class computers. Therefore, the following examples will apply specifically to Web-enabled cellular phones of WAP capabilities.

Figure 2:
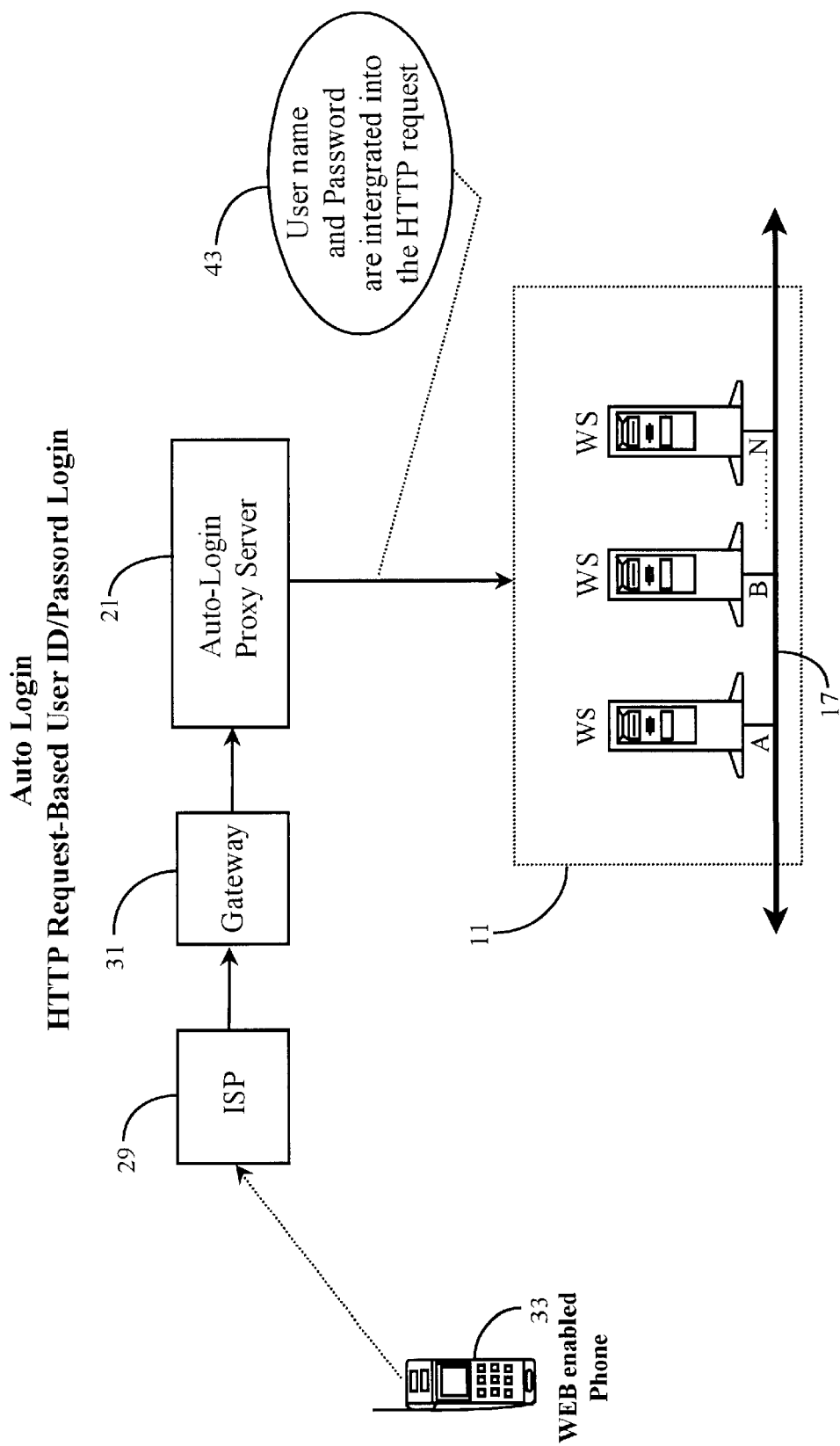
FIG. 2 is a use diagram illustrating an HTTP request-based login procedure for a WAP-enabled phone according to one embodiment of the present invention.

FIG. 2 is a use diagram illustrating an HTTP request-based login procedure for a WAP-enabled phone according to one embodiment of the present invention. The use-diagram illustrated in this example represents an HTTP request-based login that requires authentication data to be inserted into an HTTP request for accessing a target Web site. The authentication data may, in one embodiment, take the form of a user-name and password pair. In other situations, other forms of authentication may be required such as a user personal-identification-number (PIN) or code.

A user operating Web-enabled phone 33 invokes a provided auto-login link from within his or her WAP interface. The invoked hyperlink may be one linking to a Web page hosted by and served by any one of Web servers A–N illustrated as connected to backbone 17 within Internet 11. In this example Internet 11 is represented in a domain sense by a dotted rectangle instead of an Internet cloud as is the case of FIG. 1.

In practice of this example, the authentication data (typically a user-name and password pair) is inserted into an HTTP request resulting from invocation of the above-described hyperlink. Phone 33 accesses Internet 11 through ISP 29 and Gateway 31 as described in FIG. 1 and as is illustrated by a dotted arrow beginning at phone 33 and progressing to ISP 29. Therefore, an HTTP request to a target Web site hosted in one of servers A–N is communicated to auto-login server 21 through ISP 29 and Gateway 31. ALS 21 may be assumed to be connected to Internet 11 (backbone 17) and is the designated receiving server identified in the HTTP request. This server designation is pre-ordained and provided in the browser instruction built into the special auto-login link provided to the interface of phone 33 in this case. Therefore, ALS 21 is the first Web server encountered in this example.

ALS 21 has access to a data repository containing all of the user's authentication data. ALS also has access to automated navigation capability, which may be part of the server function of ALS 21 or a function provided by an intermediary server or system of servers. In either case, it is the responsibility of server 21 to retrieve to proper authentication data from storage, and insert the data into the HTTP request as represented herein by a notation labeled with the element number 43.

In one embodiment, the authentication data may be inserted into the URL portion or field of the request. In another embodiment, the authentication data is inserted into the post-data portion or field of the HTTP request. One with skill in the art of HTTP request properties will appreciate and recognize the above-described fields of a standard HTTP request.

After ALS 21 receives the HTTP request, software in the form of a run-time engine retrieves the required information from data storage. The data is then inserted into the selected fields of the HTTP request. Therefore, it may be assumed in this example that auto-login of the method described in this example is performed dynamically. ALS 21 then navigates to the target site whereupon the authentication form is populated and submitted on behalf of the user operating phone 33 successfully bypassing standard manual data entry and submission actions normally required for accessing a site that requires authentication. The electronic information page served immediately after successful login is served to phone 33 as the session is authenticated.

In one embodiment, the type of login described in this example may be applied to HDML supported sessions by providing for the insertion of authentication data into the DEST or into the POSTDATA fields of the HDML request. The inserted string may be expressed as "loginkey= XXXX&passwordkey=YYYY" where XXXX is the user's login name and YYYY is the user's password. Of course, the just described example is configured for a site requiring a user-name and password pair. Alternate strings may be created for site requiring differing forms of authentication such as a password only or a PIN entry. In this application, ALS 21 maintains the session on behalf of a user operating phone 33.

Figure 3:
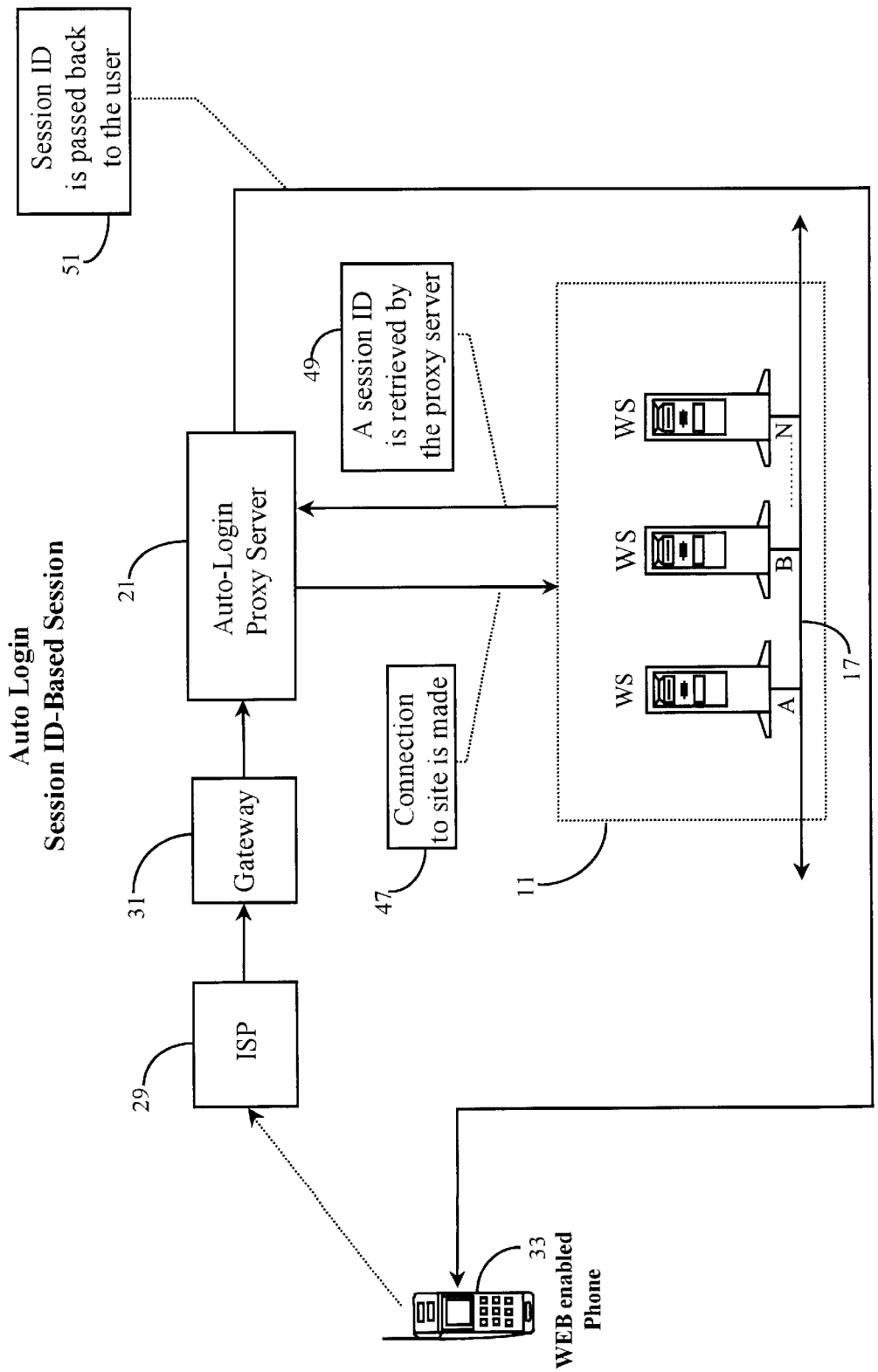
FIG. 3 is a use diagram illustrating a session ID-based login procedure for a WAP enabled phone according to another embodiment of the present invention.

FIG. 3 is a use diagram illustrating a session ID-based login procedure for a WAP-enabled phone according to another embodiment of the present invention. A session ID-based data session for a Web enabled phone requires that a session ID is assigned to a user prior to asking for a login, password or other authentication data. The session ID is a means for the server to authenticate a user during the data session while ensuring that subsequent requests to the same server during the session will be authenticated for the user's particular account (Web site) accessed.

In this example, a user operating phone 33 logs in to Internet 11 in the same fashion as described with reference to FIG. 2. That is, through ISP 29 and Gateway 31. It is specifically required in this example, that ALS 21 function as a proxy server. As previously described, a request for access to a Web site hosted in one of Web servers A–N is communicated to ALS 21 by virtue of pre-designating ALS 21 into construction provided as part of the auto-login link to the target site.

In this example, ALS 21 receives the communication request and forges a connection to the target Web site on behalf of the user. In this transaction, the session ID generated by the target server hosting the requested site is retrieved by ALS 21. The actions just described are illustrated in this example by notation labeled with element numbers 47 and 49 respectively. ALS 21 sends the session ID obtained from the target server back to phone 33 has illustrated by a notation labeled with the element number 51.

It is noted herein that a session ID is passed to a requesting user before the user enters any authentication data in order to access a target site. Therefore, ALS 21 must retrieve and insert the appropriate authentication data into the appropriate fields of the request and submit the request along with the session ID back to the target server in order to login on behalf of the requesting user operating phone 33. After successful login, the user operating phone 33 may seamlessly takeover the requested data session by virtue of the fact that any future requests during the session will be accompanied by the appropriate session ID sent to phone 33 by ALS 21.

Figure 4:
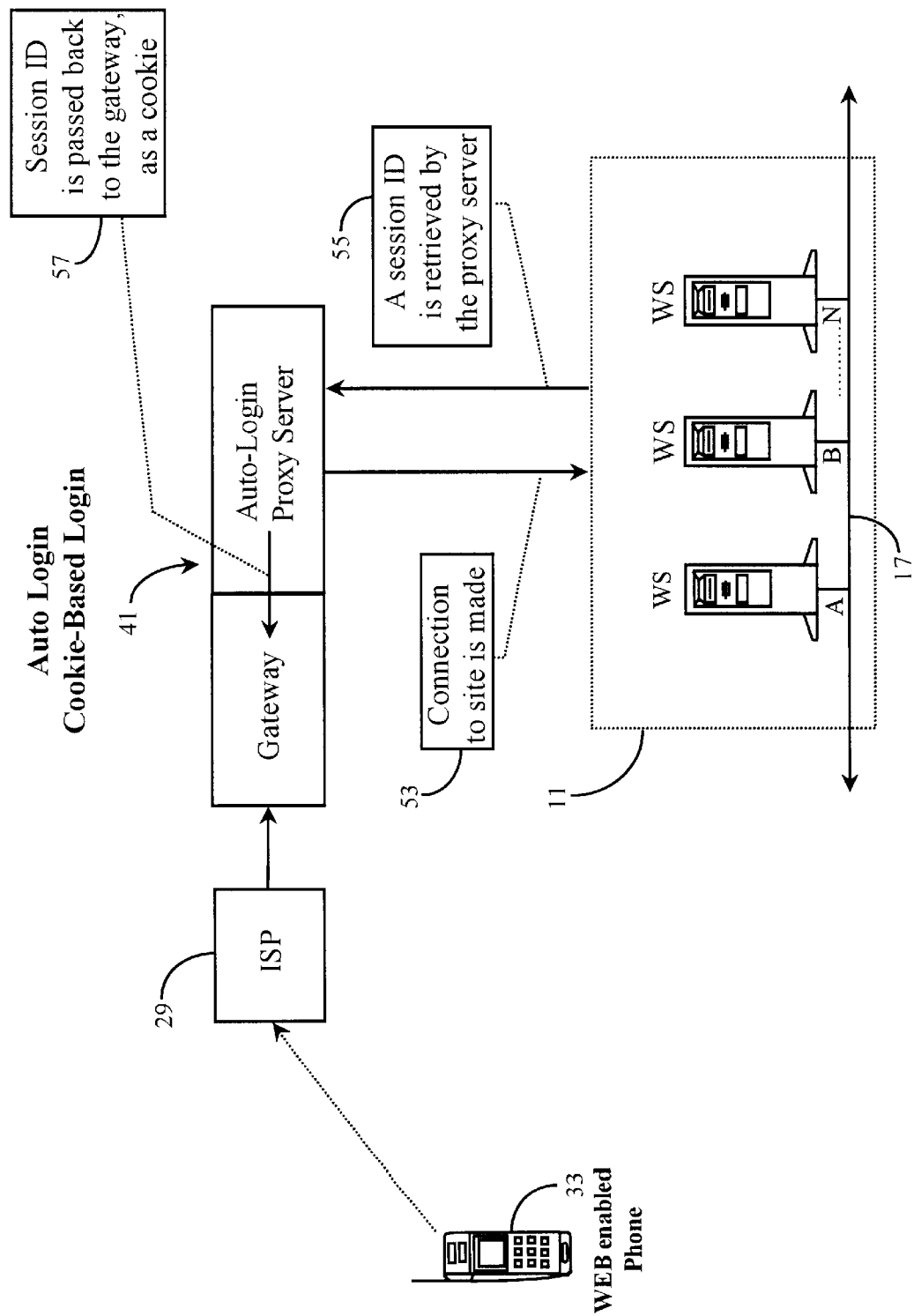
FIG. 4 is a use diagram illustrating a cookie-based login procedure for a WAP enabled phone according to a further embodiment of the present invention.

FIG. 4 is a use diagram illustrating a cookie-based login procedure for a WAP enabled phone according to a further embodiment of the present invention. Similar to the example of FIG. 3 above, the requested one of Web servers A–N assigns a session ID to phone 33 before login can be initiated. A main difference is that instead of passing a session ID with an HDML or WAP page, the session ID is of the form of a cookie, which is a small binary file received and stored in a fashion as to be transparent to a requesting user.

In the current state-of-the-art, Web-enabled phones (33) are not capable of handling cookie software. Therefore, session ID cookies are passed to the particular Gateway (31) handling the network session. The session ID cookie is particular to a data session and is stored at the Gateway on behalf of a user for the life of the session.

A challenge to provision of this type of auto-login results from the inherent feature of cookie security that associates the assigned domain name of a generating server to itself ALS 21 may receive a session ID cookie from one of Web servers A–N by representing phone 33. However, when ALS 21 attempts to pass the session ID cookie to gateway 31 or to phone 33, the assigned domain name will be that of ALS 21, effectively rendering the cookie useless as an identifier for an ongoing session between phone 33 and one of servers A–N.

To overcome the challenge described above, the inventor provides an auto-login proxy server 41 that is adapted also to function as gateway 31. In this example, Gate 31 and ALS 21 are illustrated as logically combined and labeled with element number 41. Hereinafter the enhanced combination will be referred to as ALS 41.

In one embodiment, ALS 41 is provided as a client software to an entity hosting gateway 31 (FIG. 3) such that the separate software functions of providing a network gateway and proxy functions are integrated (ALS 41). In current state-of-the-art regulations applicable to wireless ISP/gateway services, the just-described approach is a most practical approach. However, regulations regarding wireless ISP/gateway services may be altered shortly after the time of this specification to allow wireless clients to choose from a variety of ISP/gateway services offered by disparate entities. In this case, ALS 41 is enhanced with ISP and gateway functionality such that these disparate services may be offered via a single server. In a preferred embodiment, the enhanced ALS 41 would be maintained by the entity providing the proxy services.

By functioning as a client gateway, ALS 41 may set the originating domain name of a received session ID cookie to that of the appropriate target site thereby enabling a connected user operating phone 33 to takeover an ongoing session after authentication and login. It is noted herein, that actual proxy login services are initiated after a session ID cookie has been received and passed to the user, in this case, the gateway portion of ALS 41. The process is described as follows:

A user operating phone 33 logs into Internet 11 through ISP 29 and the gateway service-portion of ALS 41. ALS 41 establishes a connection to one of Web servers A–N as illustrated by a notation labeled with element number 53. A session ID cookie is retrieved by ALS 41 as illustrated by a notation labeled with element number 55. By virtue of the fact that ALS 41 incorporates gateway functionality, ALS 41 simply passes the session ID as a cookie to its gateway section as illustrated by notation labeled with element number 57 and a directional arrow associating the two functionalities. In this example, ALS 41 is able to control the domain assignment of the cookie and sets it to the appropriate domain associated with the target one of Web servers A–N.

Figure 5:
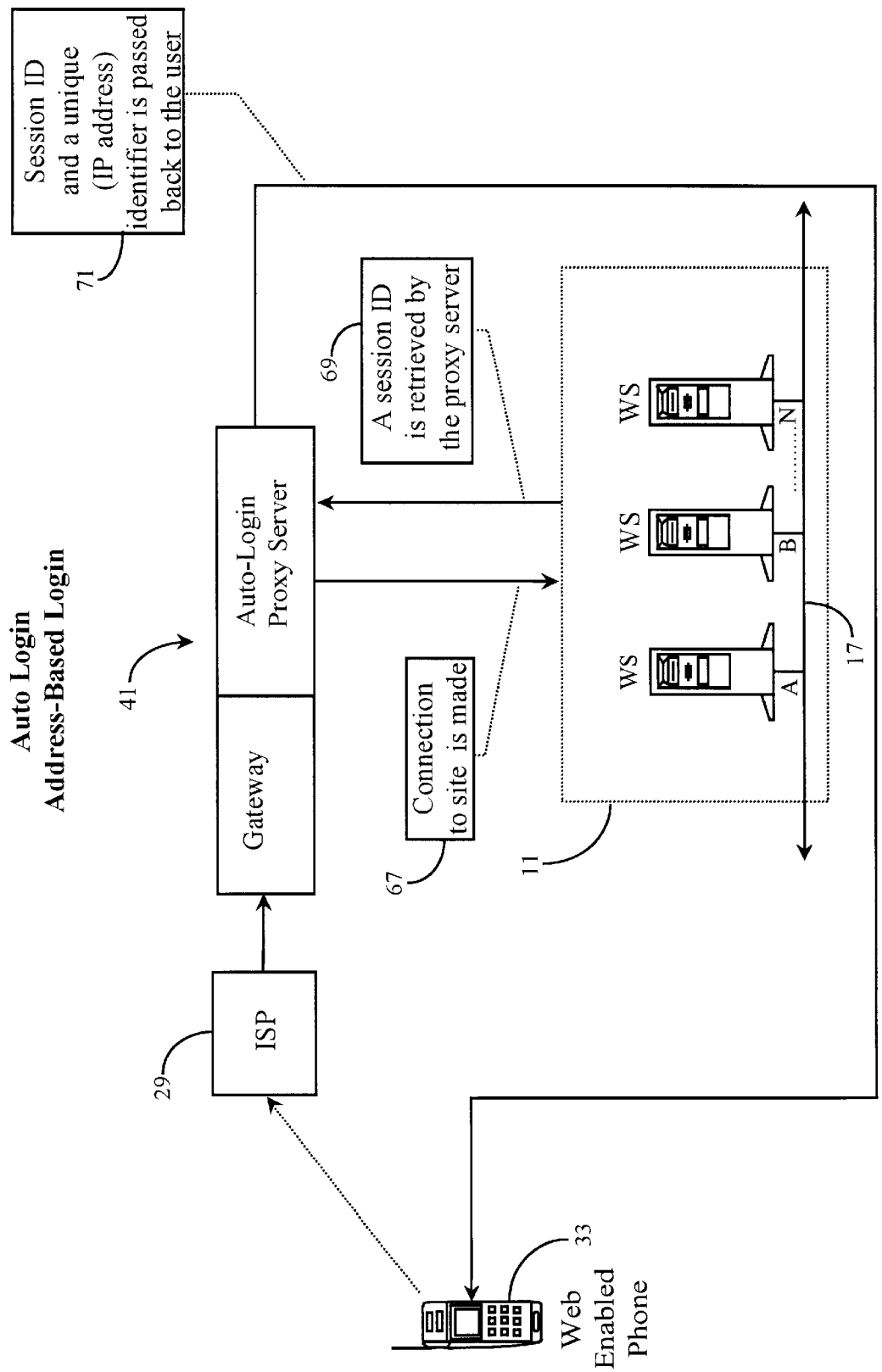
FIG. 5 is a use diagram illustrating an IP address-based login procedure for a WAP-enabled phone according to yet another embodiment of the present invention.

FIG. 5 is a use diagram illustrating an IP address-based login procedure for a WAP-enabled phone according to yet another embodiment of the present invention. An IP address-based login is typically only used in conjunction with Web sites that employ a high-level of transaction security. Examples of such sites include stock-trading sites and other sites enabling management of financial accounts. According to the level of security used, more than one form of session ID is employed. For example, a session ID may be generated for associating a client's connection to a specific money account subscribed to by the client (user). In addition to this session ID, a unique, non-transferable identifier such as a subscriber ID or the client's gateway IP address is also employed. In this way, possible hijacking of a client's session utilizing a third party computer is prevented.

The challenge in this example is how ALS 21 (FIG. 3) would initiate a session and then pass the session off to a user operating phone 33. Using the configuration of FIG. 3, this is not possible because ALS 21 and phone 33 will not have the same IP address or subscriber ID.

The above-described challenge is overcome in a similar fashion as was described with reference to FIG. 4 above. Auto-login server function as combined with gateway function and defined from a single IP address. In a preferred embodiment, ALS 41 including gateway, and in some cases the function of ISP 29, are performed from within a single addressed machine hosted by the entity providing the proxy services. This example assumes that current regulations can be drawn flexible enough to allow a user operating phone 33 to choose a gateway provider.

In this example, a user operating phone 33 logs onto Internet 11 through ISP 29 and ALS 41. ALS 41 establishes connection to the target one of Web servers A–N and requests the target Web site based on a request sent thereto from phone 33. The just-described action is illustrated in this example by a notation labeled with the element number 67. A unique session ID, which may be a subscriber ID is retrieved from the target one of Web servers A–N by ALS 41. This action is illustrated in this example by a notation labeled with an element number 69. During this transaction, the target one of Web servers A–N records the IP address of ALS 41, which in this case, is the same IP address of the gateway.

ALS 41 passes the session ID and the IP address identifier back to the user operating phone 33. In a case where the cookie is used as a unique session ID, it is passed to the gateway portion of ALS 41. The above-described action is illustrated in this example by a notation labeled with the element number 71. As previously described with reference to FIG. 4, it is preferred that ALS 41 function as a gateway and proxy server from within a same machine hosted by the entity providing the proxy services. However, in one embodiment the software functions of auto-login server 21 of FIG. 3 may be extended into the domain of existing network gateways such that the functionality of ALS 41 is emulated.

Figure 6:
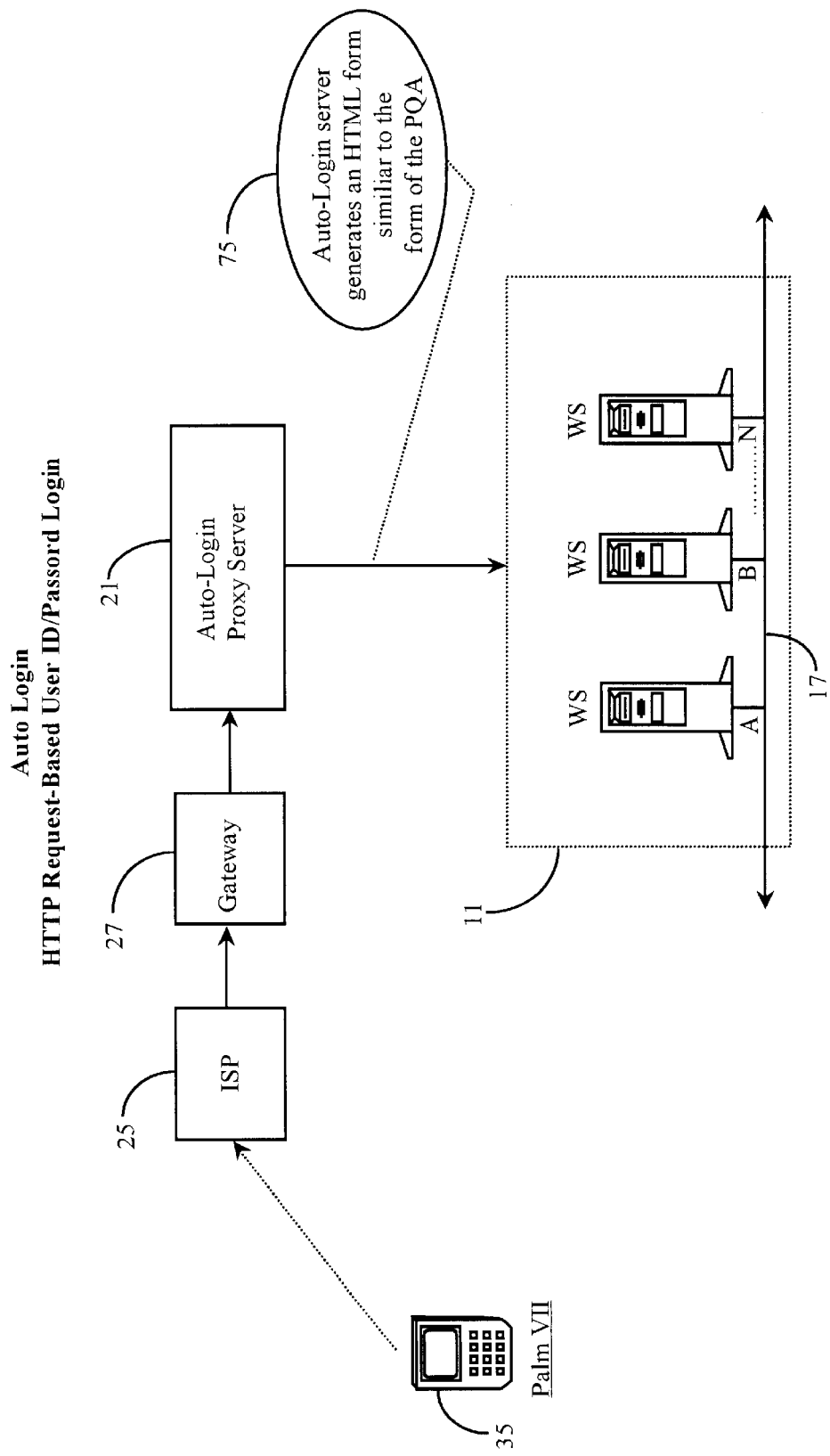
FIG. 6 is a use diagram illustrating an HTTP-based login procedure for a Palm class computer according to still another embodiment of the present invention.

FIG. 6 is a use diagram illustrating an HTTP-based login procedure for a Palm™ class computer according to still another embodiment of the present invention. In this example, the inventor provides a single solution that facilitates auto-login services for all hand-held computer appliances, which are illustrated in this example as a Palm VI™ 35. It will be apparent to one with skill in the art, that appliance 35 may be one of a variety of hand-held computers having a capability of accessing Internet 11. Therefore, for the purposes of this specification Palm VII™ 35 will hereinafter be referred to simply as hand-held 35.

As was described in the background section, PQAs are utilized as user interfaces for Palm™ class computers. Hand-held 35 may utilize PQAs (if a Palm™) or another type of proprietary interface provided by an alternate manufacturer. In a preferred embodiment and for purpose of this specification the term PQA will be referred to as the operating user interface for hand-held 35. It is noted herein that initial PQAs are provided by device manufacturers, however additional PQAs may be accessed online, downloaded and installed to hand-held 35.

There are basically two types of Web sites that may be accessed from hand-held 35 wherein auto-login benefits may be realized. One type of Web site one may access from hand-held 35 is one that is generally free to the public and requires no authentication for entry. These types of sites do not require auto login services and therefore will not be discussed in this specification with the exception that sites having online entry points, meaning that one may access a normal home page or welcome page from a conventional computer may be accessed by proxy for dynamic generation of a hyperlink for site access. In this event, connection and transfer of accessed pages may be conducted as long as the site supports Web clipping protocols. Another type of free-access site is one having no online entry point rendering and available only from a PQA. Auto login may not be performed for these sites.

Web sites that offer account-based services to users accessing the services through hand-held 35 require authentication usually in the form of a user-name and password pair. In most instances, a basic HTML form allows users to enter their user-names and passwords in order to login to their accounts is provided within the operating PQA installed on hand-held 35.

In this example, the service provider maintaining ALS 21 provides enhanced auto login links, which may replace the prior-art links originally provided within the operating PQA. The auto-login link (not shown) contains instruction for communicating an invoked HTTP request directly to ALS 21. The invoked HTTP request will contain the generic HTML form that facilitates manual login to a target Web site hosted in a target one of Web servers A–N.

In a preferred embodiment, ALS 21 receives an HTTP request from hand-held 35 and then duplicates the standard HTML form accompanying the request. The appropriate user-name and password pair associated with the target account is inserted into the appropriate fields of the duplicate HTML request. The duplicate request containing the auto-login instruction is used to open the requested data session. A user operating hand-held 35 does not see a login page. The proxy service is transparent to the user operating hand-held 35.

In practice of the method described in this example, a user operating hand-held 35 logs onto Internet 11 through ISP 25, gateway 27. Once connected, invocation of a provided auto-login link invokes an HTTP request containing the standard PQA login form. ALS 21 generates an HTML form similar to the form contained within the PQA as is illustrated herein by a notation labeled with the element number 75 witnessing a directional arrow from ALS 21 into Internet 11. In this case, ALS 21 maintains the data session on behalf of the user operating hand-held 35 as long as the session is not terminated.

It will be apparent to one with skill in the art that proxy services related to automatically logging into a web site on behalf of a user may be applied to a number of differing embodiments as has been described in this specification. In all cases of auto login to services requiring authentication, the process is completely transparent to users. It will also be apparent to the skilled artisan that instructional software tags must be created and invoked by an auto-login software engine utilized by ALS 21 (FIGS. 1–3, and 6) and by ALS 41 (FIGS. 4 and 5).

For example, all Web sites which are accessible to a Palm VII™ using a scaled-down version of HTML referred to as a Web clippings application can be serviced by providing links of the following exemplary form.

```
1   <FORM ACTION="https://wc.amtdw.com/cgi-
2   bin/syncMain.cgi"
3      METHOD=post>
4         <INPUT TYPE=hidden NAME="login"
5   VALUE="myUserID">
6         <INPUT TYPE=hidden NAME="password"
7   VALUE="myPassword">
           <INPUT TYPE=hidden NAME="version"
    VALUE="1.01">
           <INPUT TYPE=submit VALUE="Auto-Login">
    </FORM>
```

The form displayed above is an actual link and appears in a PQA interface has an auto-log and icon which may be invoked by a user. When invoked the form will direct the Web clippings Bowser to an exemplary URL address such as "https://wc.amtdw.com/cgi-bin/syncMain.cgi". Using the POST field as previously described, the Web clippings browser low pass the authentication data to a target site in a duplicated HTML form. The only variables that must be retrieved are the actual user-name and password pairs. All of the other fields of the duplicate form will remain constant for all users and can remain in the form.

HDML links provided for Web enabled cellular phones are illustrated in the following examples:

Sites that do not require user names or passwords can be accessed by providing HDML links of the following form.

```
1   <CHOICE>
2      <CE TASK=GO
3      DEST="http://www.amazon.com/cgi-bin/phone.cgi?version=1.01"
4      POSTDATA="login=myUserID&password=myPassword&x=1">
5      Auto-Login
6   </CHOICE>
```

Similar to the Palm™ links, there are variables included such as "version" and "X" and dynamic variables such as "login" and "password". No retrieval and insertion of authentication data is required during processing of the above instruction during run-time if the target site requires no authentication data for access. Therefore, the above form may be stored as is at the site of the service provider and reused as required.

HDML Web sites that require authentication data may be accessed by a link constructed of the following form:

```
1   <CHOICE>
2      <CE TASK=GO
3      DEST="http://www.amazon.com/cgi-bin/phone.cgi?version=1.01"
4
5   POSTDATA=
    "login=_USERNAME_&password=_PASSWORD_&x=1">
6      Auto-Login
    </CHOICE>
```

The fields wherein user-name and password data are inserted are presented in bold.

A database model for managing the proxy services described above will include parameters for platform identification, device identification, field identification and so on. The software engine of ALS 21 and 41 accesses user information annualizes database resources according to design.

In one embodiment of the present invention, an auto-login link is provided for a more recent wireless markup language (W ML) platform envisioned for mobile phones having Internet capability. An exemplary login form for WML is presented below:

```
1   <go method="post" href="http://www.amazon.com/login.cgi">
2      <postfield name="email" value="myUserID"/>
3      <postfield name="password" value="myPassword"/>
4      <postfield name="version" value="1.01"/>
5      <postfield name="submit" value="Auto-Login"/>
    </go>
```

Dynamically generated parameters attributed to the example for presented above are set in bold type.

Figure 7:
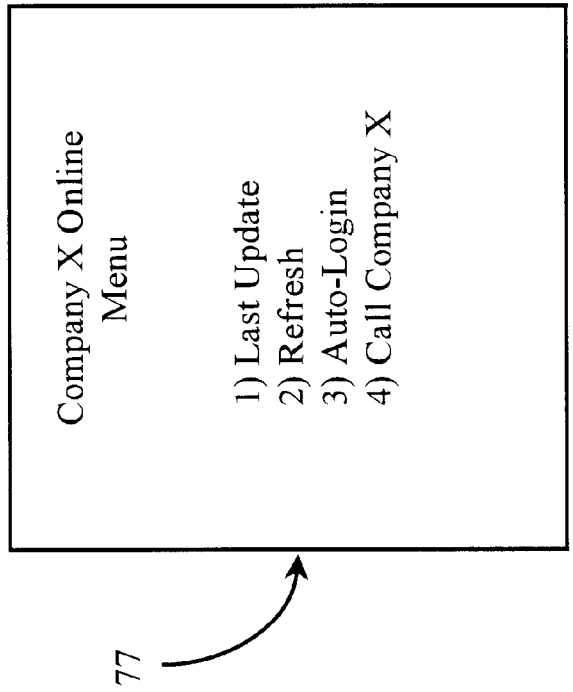
FIG. 7 is an exemplary plan view of a user interface containing auto login functionality and adapted for a Web enabled phone.

FIG. 7 is an exemplary plan view of a user interface 77 containing auto login functionality adapted for a Web enabled phone. Interface 77 is exemplary 11 interface that may be displayed on Web-enabled phone 33 of this specification. In this example, there are four text options provided in relation to communication with an exemplary entity referred to as Company X in this exemplary interface. Interface 77 may be assumed to be a user interface provided by the company known as Company X. Company X may be a stock-trading company or any other service provider.

Although there are four interactive options presented with an interface 77, only option 3 applies to the scope of this specification. Option 3 is an auto-login link, which allows an interfacing user to receive auto-login services as taught in this specification upon invocation of the link as was described earlier in this specification. The inventor seeks only to illustrate an exemplary interface containing the described auto-login link as it might appear to a user. There are many alternative possibilities for display construction and configuration.

Figure 8:
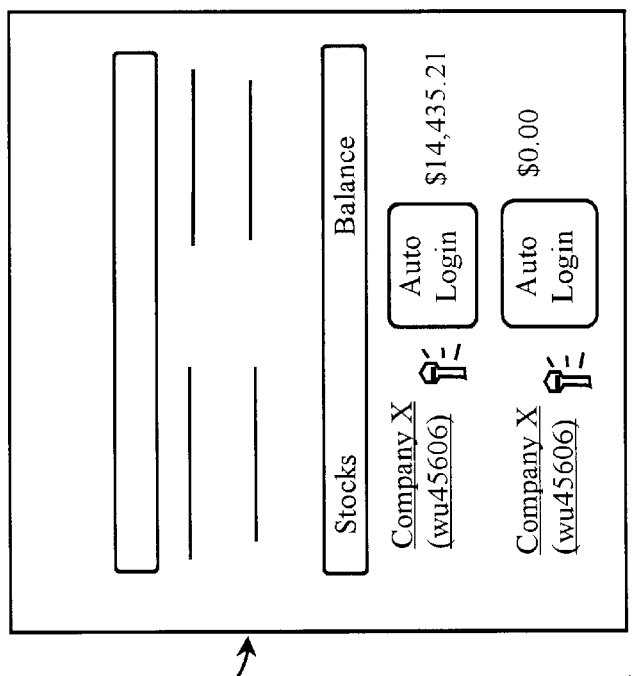
FIG. 8 is a plan view of a Palm device displaying a user interface and adapted for and executing auto login functionality.

FIG. 8 is a plan view of a user interface 79 adapted for a hand-held computer and containing auto login functionality. In this example, interface 79 is a stock portfolio interface of company X of FIG. 7. There are illustrated two links for providing auto-login functionality to the two listed accounts. The first account describes company X Online access for an exemplary account or portfolio number (wu62479). An auto-login icon appears next to the description. Balance information for the account is listed next to the auto-login link.

The second listed account is different from the first account and requires additional authentication in order to access it. An exemplary account or portfolio number (wu45606) defines the account. An auto-login icon (actual link) is provided next to the account description as described above along with an account balance reading zero funds. The inventor intends that interface 79 represent just one configuration of an interface that may be presented to a user operating a hand-held computer having Internet capability. A unique feature of this interface is that separate accounts of a same company have separate authentication requirements and therefore require separate auto-login links.

It will be apparent to one with skill in the art, that by providing auto-login functionality to users operating wireless devices represents not only an enormous convenience to users, but also a tremendous savings in bandwidth shared among multiple users operating on a same system. In preferred embodiments of the present invention, the method and apparatus is practiced on the Internet network utilizing in-place cellular networks and digital services. However, the method and apparatus of the present invention may also be practiced on Internet capable sub-networks such as WANs or LANs utilizing proprietary wireless networks without departing from the spirit and scope of the present invention as long as the appropriate protocols are supported.

The method and apparatus of the present invention may be applied to a variety of differing wireless embodiments as taught in this specification and may be envisioned to be applied to any newly developed embodiments and protocols. Therefore, the spirit and scope of the present invention should be limited only by the claims that follow.

What is claimed is:

1. A network-based system for providing automatic login to a network-connected data source on behalf of a network-connected user accessing the system through a wireless communication appliance comprising:

a wireless communication appliance, the appliance having network capability and an interactive user interface, the appliance operated for the purpose of accessing the network-connected data source;

a network service-provider for providing access to the network;

a network gateway for managing communication between the appliance and network-connected data source;

a network-connected server node for performing proxy navigation and automated login services for the network-connected user;

a data repository accessible to the network-connected server node, the data repository for holding data about the network-connected user; and a network-connected data source, the data source accessible to the network-connected server node, characterized in that a user operating the appliance while connected to the network invokes a hyperlink displayed in the user interface, the hyperlink containing a browser instruction for contacting the network-connected server node, the server node directing automated navigation to and login to the data source defined by the hyperlink, the login accomplished through automated insertion of user data retrieved from the data repository into the appropriate fields of a login request.

2. The network-based system of claim 1, wherein the network is the Internet network.

3. The network-based system of claim 2, wherein the wireless communication appliance is a handheld computer.

4. The network-based system of claim 2, wherein the wireless communication appliance is a cellular telephone.

5. The network-based system of claim 1, wherein the network service-provider and the network gateway are hosted by a single entity.

6. The network-based system of claim 1, wherein the network service-provider, the network gateway, and the network-connected server node are hosted by a single entity.

7. The network-based system of claim 2, wherein the user data comprises a user name and password pair required as authentication to the network-connected data source defined by the hyperlink.

8. The network-based system of claim 2, wherein the user data comprises a personal identification code.

9. The network-based system of claim 2, wherein a user data comprises a user name and password pair and a personal identification code.

10. The network-based system of claim 3, wherein invocation of the hyperlink results in an HTTP request containing an HTML form for logging into the network-connected data source, the form replaced with a similar form venerated by the network-connected server node, the similar form containing the authentication information.

11. The network-based system of claim 10, wherein the authentication information is a user name and password pair.

12. The network-based system of claim 11, wherein the authentication information is a personal identification code.

13. The network-based system of claim 10, wherein the authentication information is a user name and password pair and a personal identification code.

14. The network-based system of claim 4, wherein invocation of the hyperlink results in an HDML request containing an HDML form for logging into the network-connected data source, the form accepting the user authentication information inserted therein by the network-connected server node.

15. The network-based system of claim 14, wherein the authentication information is a user name and password pair.

16. The network-based system of claim 15, wherein the authentication information is a personal identification code.

17. The network-based system of claim 14, wherein the authentication information is a user name and password pair and a personal identification code.

18. The network-based system of claim 2, wherein the automated login includes generation of a session ID at the network-connected data source, the session ID retrieved from the data source by the network-connected server node and passed back to the requesting appliance.

19. The network-based system of claim 18, wherein the session ID is of the form of a cookie.

20. The network-based system of claim 2, wherein the automated log in includes generation of a session ID at the network-connected data source, the session ID retrieved from the data source by the network-connected server node and passed back to the network gateway used by the requesting appliance.

21. The network-based system of claim 20, wherein the session ID is of the form of a cookie.

22. The network-based system of claim 4, wherein wireless-application-protocol is the communication protocol.

23. The network-based system of claim 4, wherein wireless-markup-language is the communication language.

24. A proxy server for performing automated navigation and login to a network-connected data source on behalf of a network-connected user operating a network-capable wireless appliance comprising:

at least one port for receiving requests from the wireless appliance;

at least one port for establishing a network connection to the data source;

at least one port for establishing a data connection to a data repository; and a software engine for retrieving data from the data repository and inserting the data into appropriate fields of a request to the data source, such that upon receiving a request from the wireless appliance, the proxy server retrieves authentication data from the data repository and inserts the data into the request or into a duplicate thereof, the request containing the authentication data sent to the data source whereupon the data source accepting the authentication data, registers a successful login, and authenticates the user for an established data session.

25. The proxy server of claim 24, wherein the network is the Internet network.

26. The proxy server of claim 25, wherein the wireless appliance is a handheld computer.

27. The proxy server of claim 25, wherein the wireless appliance is a cellular telephone.

28. The proxy server of claim 25 further comprising:
software for enabling function as a network service-provider; and
software for enabling the function as a network gateway.

29. The proxy server of claim 25, wherein the data retrieved from the data repository comprises a user name and password pair required as authentication data for logging into to the network-connected data source.

30. The proxy server of claim 29, wherein the data retrieved from the data repository comprises a personal identification code.

31. The proxy server of claim 29, wherein the data retrieved from the data repository comprises a user name and password pair and a personal identification code.

32. The proxy server of claim 25, wherein the received request from the wireless appliance results from user invocation of a provided hyperlink viewable in the display portion of the wireless appliance.

33. The proxy server of claim 32, wherein the received request from the wireless appliance is an HTTP request.

34. The proxy server of claim 32, wherein the received request from the wireless appliance is an HDML request.

35. The proxy server of claim 32, wherein the received request from a wireless appliance is a WML request.

36. The proxy server of claim 32, wherein a data session established by the proxy server on behalf of the network-connected user is rendered under the control of the user.

37. The proxy server of claim 36, wherein the automated login includes generation of a session ID at the network-connected data source, the session ID retrieved from the data source by the proxy server and passed back to the requesting appliance.

38. The proxy server of claim 37, wherein the session ID is of the form of a cookie.

39. The proxy server of claim 36, wherein the automated log in includes generation of a session ID at the network-connected data source, the session ID retrieved from the data source by the proxy server and passed back to a network gateway used by the requesting appliance.

40. The proxy server of claim 39, wherein the network gateway and the proxy server function are listed on a same machine.

41. A method for establishing a network data session by proxy on behalf of a user operating a network-capable, wireless appliance comprising:
(a) providing a hyperlink within a user interface of the network-capable appliance, the hyperlink specifying the data source and the proxy-service node to establish the session;
(b) invoking the hyperlink thereby communicating a request for site-access to the proxy-service node;
(c) receiving the request at the proxy-service node;
(d) retrieving authentication data from a connected data repository for insertion into the appropriate form-fields of the request;
(e) sending the request containing the authentication criteria and action instructions to the target site identified in the request;
(f) logging in to the target site and authenticating the user by submitting the appropriate form containing the authentication data; and
(g) rendering the established and authenticated data session under the control of the requesting user.

42. The method of claim 41, wherein the network is the Internet network.

43. The method of claim 42, wherein the network-capable, wireless appliance is a handheld computer.

44. The method of claim 42, wherein the network-capable, wireless appliance is a cellular telephone.

45. The method of claim 42 wherein in step (a), the provided hyperlink contains browser instruction for performing proxy navigation and auto login procedures.

46. The method of claim 45 wherein in step (a), the provided hyperlink further contains instruction for retrieval of authentication data required for login purposes.

47. The method of claim 46 wherein in step (b), the site-access request is an HTTP request.

48. The method of claim 46 wherein in step (b), the hyperlink is of the form of an HDML link.

49. The method of claim 46 wherein in step (b), the hyperlink is of the form of a WML link.

50. The method of claim 46 wherein in step (b), the hyperlink is of the form of an HTML link.

51. The method of claim 46 wherein in step (d), the authentication data is of the form of the user name and password pair required to access the site.

52. The method of claim 46 wherein in step (d), the authentication data is of the form of a personal identification code required to access the site.

53. The method of claim 46 wherein in step (d), the authentication data is of the form of a personal identification code and the user name and password pair required to access the site.

54. The method of claim 46 wherein in step (d), a login form contained within the received request is replaced with a similar form already containing the appropriate authentication data.

* * * * *